US009160228B1

(12) United States Patent
Parker et al.

(10) Patent No.: US 9,160,228 B1
(45) Date of Patent: Oct. 13, 2015

(54) INTEGRATED TRI-STATE ELECTROMAGNETIC INTERFERENCE FILTER AND LINE CONDITIONING MODULE

(71) Applicant: Crane Electronics, Inc., Redmond, WA (US)

(72) Inventors: Ernest Parker, Mill Creek, WA (US); Dongmin Liu, Redmond, WA (US); Anton Zlatev, Edmonds, WA (US)

(73) Assignee: Crane Electronics, Inc., Redmond, WA (US)

( * ) Notice: Subject to any disclaimer, the term of this patent is extended or adjusted under 35 U.S.C. 154(b) by 0 days.

(21) Appl. No.: 14/632,818

(22) Filed: Feb. 26, 2015

(51) Int. Cl.
*H02M 1/44* (2007.01)
*H02M 3/158* (2006.01)

(52) U.S. Cl.
CPC ................ *H02M 1/44* (2013.01); *H02M 3/158* (2013.01)

(58) Field of Classification Search
CPC ......................................................... H02M 1/44
USPC ................ 323/222, 266, 299; 363/39, 40, 44
See application file for complete search history.

(56) References Cited

U.S. PATENT DOCUMENTS

| | | | |
|---|---|---|---|
| 3,144,627 A | 8/1964 | Dunnabeck et al. | |
| 3,201,728 A | 8/1965 | McWhirter | |
| 4,128,868 A | 12/1978 | Gamble | |
| 4,255,784 A | 3/1981 | Rosa | |
| 4,337,569 A | 7/1982 | Pierce | |
| 4,533,986 A * | 8/1985 | Jones | 363/17 |
| 4,618,812 A * | 10/1986 | Kawakami | 323/224 |
| 4,635,002 A | 1/1987 | Riebeek | |
| 4,719,552 A * | 1/1988 | Albach et al. | 363/44 |
| 4,743,835 A | 5/1988 | Bossé et al. | |
| 4,920,309 A | 4/1990 | Szepesi | |
| 4,956,626 A | 9/1990 | Hoppe et al. | |

(Continued)

FOREIGN PATENT DOCUMENTS

| | | |
|---|---|---|
| CN | 101326705 A | 12/2008 |
| CN | 201219235 Y | 4/2009 |

(Continued)

OTHER PUBLICATIONS

"Application Guide: Theory of Operation," MicroPower Direct, URL= http://micropowerdirect.com/PDF%20Files/Application%20Notes/Power%20Supply%20Theory%20of%20Operation.pdf, download date Apr. 18, 2012, 6 pages.

(Continued)

*Primary Examiner* — Jeffrey Sterrett
(74) *Attorney, Agent, or Firm* — Seed IP Law Group PLLC

(57) ABSTRACT

This disclosure describes systems, methods and articles of a passive EMI filter integrated with an active boost converter for low-side line transients and/or an active clipper for high-side line transients. During steady-state operation, the active circuitry is disabled so the circuit functions as a passive EMI filter. Inductive and capacitive components used in the passive EMI filter during steady-state operation may serve a dual role and become part of a boost converter when input voltage is below a low-line steady-state and, in some variations, the inductive and capacitive components may become part of a transient clipper when the input voltage is above a high-line steady-state level. The transient clipper may be implemented as a linear pass element or as a switch-mode converter (e.g., buck converter).

26 Claims, 4 Drawing Sheets

(56) References Cited

U.S. PATENT DOCUMENTS

| | | | |
|---|---|---|---|
| 4,992,919 A | 2/1991 | Lee et al. | |
| 5,148,357 A | 9/1992 | Paice | |
| 5,396,165 A * | 3/1995 | Hwang et al. | 323/210 |
| 5,418,502 A | 5/1995 | Ma et al. | |
| 5,430,640 A | 7/1995 | Lee | |
| 5,436,550 A * | 7/1995 | Arakawa | 323/222 |
| 5,469,124 A | 11/1995 | O'Donnell et al. | |
| 5,481,225 A | 1/1996 | Lumsden et al. | |
| 5,521,807 A | 5/1996 | Chen et al. | |
| 5,631,822 A | 5/1997 | Silberkleit et al. | |
| 5,638,262 A | 6/1997 | Brown | |
| 5,691,629 A * | 11/1997 | Belnap | 323/266 |
| 5,694,303 A | 12/1997 | Silberkleit et al. | |
| 5,774,347 A | 6/1998 | Nakanishi | |
| 5,831,418 A * | 11/1998 | Kitagawa | 323/222 |
| 5,903,504 A | 5/1999 | Chevallier et al. | |
| 6,002,318 A | 12/1999 | Werner et al. | |
| 6,043,705 A | 3/2000 | Jiang | |
| 6,137,373 A | 10/2000 | Mori | |
| 6,141,232 A | 10/2000 | Weinmeier et al. | |
| 6,157,180 A | 12/2000 | Kuo | |
| 6,157,282 A | 12/2000 | Hopkinson | |
| 6,236,194 B1 | 5/2001 | Manabe et al. | |
| 6,335,872 B1 | 1/2002 | Zhou et al. | |
| 6,343,026 B1 | 1/2002 | Perry | |
| 6,456,511 B1 | 9/2002 | Wong | |
| 6,469,478 B1 * | 10/2002 | Curtin | 323/266 |
| 6,472,852 B1 | 10/2002 | Lethellier | |
| 6,492,890 B1 | 12/2002 | Woznlczka | |
| 6,545,534 B1 | 4/2003 | Mehr | |
| 6,643,151 B1 | 11/2003 | Nebrigic et al. | |
| 6,697,955 B1 | 2/2004 | Malik et al. | |
| 6,798,177 B1 * | 9/2004 | Liu et al. | 323/222 |
| 6,850,048 B2 | 2/2005 | Orr et al. | |
| 6,998,901 B2 | 2/2006 | Lee | |
| 7,012,413 B1 * | 3/2006 | Ye | 323/284 |
| 7,061,212 B2 | 6/2006 | Phadke | |
| 7,095,215 B2 * | 8/2006 | Liu et al. | 323/222 |
| 7,129,808 B2 | 10/2006 | Roebke et al. | |
| 7,164,584 B2 | 1/2007 | Walz | |
| 7,183,727 B2 | 2/2007 | Ferguson et al. | |
| 7,199,563 B2 * | 4/2007 | Ikezawa | 323/266 |
| 7,202,644 B2 * | 4/2007 | Nitta et al. | 323/259 |
| 7,206,210 B2 | 4/2007 | Harnett et al. | |
| 7,227,754 B2 | 6/2007 | Griesinger et al. | |
| 7,242,168 B2 * | 7/2007 | Muller et al. | 323/222 |
| 7,286,376 B2 | 10/2007 | Yang | |
| 7,304,828 B1 | 12/2007 | Shvartsman | |
| 7,339,804 B2 | 3/2008 | Uchida | |
| 7,369,024 B2 | 5/2008 | Yargole et al. | |
| 7,515,005 B2 | 4/2009 | Dan | |
| 7,564,706 B1 | 7/2009 | Herbert | |
| 7,577,539 B2 | 8/2009 | Hubanks et al. | |
| 7,579,901 B2 | 8/2009 | Yamashita | |
| 7,602,273 B2 | 10/2009 | Yoshikawa | |
| 7,616,459 B2 | 11/2009 | Huynh et al. | |
| 7,730,981 B2 | 6/2010 | McCabe et al. | |
| 7,742,318 B2 | 6/2010 | Fu et al. | |
| 7,786,712 B2 * | 8/2010 | Williams | 323/266 |
| 7,847,519 B2 | 12/2010 | Ho | |
| 7,884,317 B2 | 2/2011 | Casper | |
| 7,893,804 B2 | 2/2011 | Kaveh Ahangar et al. | |
| 8,009,004 B2 | 8/2011 | Ahangar et al. | |
| 8,040,699 B2 | 10/2011 | Huynh et al. | |
| 8,067,992 B2 | 11/2011 | Chen et al. | |
| 8,072,195 B2 * | 12/2011 | Aan De Stegge et al. | 323/224 |
| 8,102,162 B2 * | 1/2012 | Moussaoui et al. | 323/266 |
| 8,279,631 B2 | 10/2012 | Yang | |
| 8,358,118 B2 | 1/2013 | Chen et al. | |
| 8,378,647 B2 * | 2/2013 | Yonezawa et al. | 323/222 |
| 8,508,195 B2 * | 8/2013 | Uno | 323/222 |
| 8,520,415 B1 | 8/2013 | Krishnamoorthy et al. | |
| 8,552,589 B2 | 10/2013 | Ghosh et al. | |
| 8,570,006 B2 * | 10/2013 | Moussaoui et al. | 323/266 |
| 8,649,128 B2 | 2/2014 | Wang et al. | |
| 8,736,240 B2 * | 5/2014 | Liu et al. | 323/266 |
| 8,764,247 B2 | 7/2014 | Pattekar et al. | |
| 8,810,214 B2 * | 8/2014 | Van Dijk et al. | 323/266 |
| 8,824,167 B2 | 9/2014 | Hughes et al. | |
| 8,829,868 B2 | 9/2014 | Waltman et al. | |
| 9,030,178 B2 | 5/2015 | Chang et al. | |
| 9,106,142 B2 | 8/2015 | Huang et al. | |
| 2002/0015320 A1 | 2/2002 | Mochikawa et al. | |
| 2002/0071300 A1 | 6/2002 | Jang et al. | |
| 2004/0125523 A1 | 7/2004 | Edwards et al. | |
| 2004/0178776 A1 * | 9/2004 | Hansen et al. | 323/266 |
| 2006/0039172 A1 | 2/2006 | Soldano | |
| 2006/0132105 A1 | 6/2006 | Prasad et al. | |
| 2006/0212138 A1 | 9/2006 | Zhang | |
| 2006/0220629 A1 | 10/2006 | Saito et al. | |
| 2007/0152644 A1 * | 7/2007 | Vinn | 323/266 |
| 2008/0031014 A1 | 2/2008 | Young | |
| 2008/0197724 A1 | 8/2008 | Cullen et al. | |
| 2009/0067206 A1 | 3/2009 | Oguchi et al. | |
| 2009/0128110 A1 | 5/2009 | DeLurio et al. | |
| 2009/0167432 A1 | 7/2009 | van den Heuvel | |
| 2009/0174381 A1 | 7/2009 | Ojanen et al. | |
| 2009/0237057 A1 | 9/2009 | Dishman et al. | |
| 2009/0256547 A1 | 10/2009 | Akyildiz et al. | |
| 2009/0273431 A1 | 11/2009 | Hurst | |
| 2009/0302775 A1 | 12/2009 | Alexandrov | |
| 2009/0321045 A1 | 12/2009 | Hernon et al. | |
| 2009/0321046 A1 | 12/2009 | Hernon et al. | |
| 2010/0014330 A1 | 1/2010 | Chang et al. | |
| 2010/0117715 A1 | 5/2010 | Ariyama | |
| 2010/0176755 A1 | 7/2010 | Hoadley et al. | |
| 2010/0253309 A1 | 10/2010 | Xi et al. | |
| 2011/0169471 A1 | 7/2011 | Nagasawa | |
| 2011/0241637 A1 | 10/2011 | Parker | |
| 2012/0268227 A1 | 10/2012 | Howes et al. | |
| 2013/0021008 A1 | 1/2013 | Hume et al. | |
| 2013/0021108 A1 | 1/2013 | Hughes | |
| 2013/0021702 A1 | 1/2013 | Waltman et al. | |
| 2013/0049918 A1 * | 2/2013 | Fu et al. | 336/220 |
| 2013/0245854 A1 | 9/2013 | Rinne et al. | |
| 2013/0272040 A1 | 10/2013 | Feng et al. | |
| 2013/0299148 A1 | 11/2013 | Hernon et al. | |
| 2014/0016356 A1 | 1/2014 | Furmanczyk et al. | |
| 2014/0070887 A1 | 3/2014 | Lam et al. | |
| 2014/0118946 A1 | 5/2014 | Tong et al. | |
| 2014/0327417 A1 * | 11/2014 | Zhu et al. | 323/266 |
| 2015/0137412 A1 | 5/2015 | Schalansky | |

FOREIGN PATENT DOCUMENTS

| | | |
|---|---|---|
| CN | 103582997 A | 2/2014 |
| CN | 104704742 A | 6/2015 |
| JP | 2001-320250 A | 11/2001 |
| JP | 2002-076799 A | 3/2002 |
| JP | 2007-263944 A | 10/2007 |
| JP | 5030216 B2 | 9/2012 |
| KR | 2008-019196 A | 3/2008 |
| KR | 2008-101784 A | 11/2008 |
| WO | 2011/123680 A2 | 10/2011 |
| WO | 2012/100810 A1 | 8/2012 |
| WO | 2012/116263 A1 | 8/2012 |
| WO | 2014/039982 A1 | 3/2014 |
| WO | 2014/103298 A1 | 7/2014 |

OTHER PUBLICATIONS

"Buck converter," URL= http://en.wikipedia.org/wiki/Buck_converter, download date Jun. 23, 2011, 14 pages.

"EMI Suppression Filters (EMIFIL®) for AC Power Lines," Murata Manufacturing Co., Ltd., Cat.No. C09E-14, downloaded on Feb. 21, 2014, 27 pages.

"Maximum Flexible Power (MFP) Single Output Point of Load: Technical Preview-3-6 VDC IN, 7 Amp, Non-Isolated DC/DC Converter," Crane Aerospace & Electronics Power Solutions, 2010, 17 pages.

"Step-gap "E" core swing chokes: Improved regulation and higher efficiency are possible when operating at minimum current levels," Technical Bulletin: Bulletin FC-S4, Magnetics Division, Spang & Company, Butler, Pennsylvania, 2001, 4 pages.

(56) References Cited

OTHER PUBLICATIONS

"Synchronous Rectification Aids Low-Voltage Power Supplies," Maxim Integrated Products, URL= http://www.maxim-ic.com/appnotes/index.mvp/id/652, download date Jun. 22, 2011, 6 pages.
Coates, "Power supplies—3.0 Switched Mode Power Supplies," www.learnabout-electronics.org, 2007-2013, 20 pages.
eCircuit Center, "Op Amp Input Offset Voltage," 2002, retrieved from http://www.ecircuitcenter.com/Circuits/op_voff/op_voff.htm on Mar. 26, 2012, 3 pages.
eCircuit Center, "Op Amp Offset Adjustment," 2002, retrieved from http://www.ecircuitcenter.com/Circuits/op_voff/op_voff2.htm on Mar. 26, 2012, 3 pages.
Hughes et al., "Self Synchronizing Power Converter Apparatus and Method Suitable for Auxiliary Bias for Dynamic Load Applications," Notice of Allowance mailed May 14, 2014, for U.S. Appl. No. 13/185,217, 10 pages.
Hughes, "Oscillator Apparatus and Method With Wide Adjustable Frequency Range," Office Action mailed Jun. 5, 2013, for U.S. Appl. No. 13/185,152, 17 pages.
Hughes, "Oscillator Apparatus and Method With Wide Adjustable Frequency Range," Amendment filed Oct. 7, 2013, for U.S. Appl. No. 13/185,152, 15 pages.
Hughes, "Oscillator Apparatus and Method With Wide Adjustable Frequency Range," Office Action mailed Jan. 28, 2014, for U.S. Appl. No. 13/185,152, 15 pages.
Hughes, "Oscillator Apparatus and Method With Wide Adjustable Frequency Range," Amendment filed Apr. 24, 2014, 2014, for U.S. Appl. No. 13/185,152, 8 pages.
Hughes, "Oscillator Apparatus and Method With Wide Adjustable Frequency Range," Notice of Allowance mailed Jul. 14, 2014, for U.S. Appl. No. 13/185,152, 12 pages.
Hume et al., "Power Converter Apparatus and Method With Compensation for Light Load Conditions," Office Action mailed Nov. 6, 2013, for U.S. Appl. No. 13/185,142, 11 pages.
International Search Report, mailed Dec. 20, 2013, for PCT/US2013/058784, 3 pages.
International Search Report, mailed Oct. 14, 2011, for PCT/US2011/030778, 3 pages.
Kristjansson et al., "Solutions to Today's Low Voltage Power Design Challenges Using High-Efficiency, Non-Isolated Point of Load Converters: A Discussion of the Interpoint™MFP Series™Point of Load Converter," Crane Aerospace & Electronics, Power Solutions—Interpoint Products, Redmond, WA, Oct. 2011, Revised Jan. 2012, 25 pages.
Lam et al., "Dynamic Maneuvering Configuration for Multiple Control Modes in a Unified Servo System," Office Action mailed Dec. 23, 2014, for U.S. Appl. No. 14/333,705, 6 pages.
Lam et al., "Impedance Compensation for Operational Amplifiers Used in Variable Environments," Notice of Allowance mailed Jun. 27, 2014, for U.S. Appl. No. 13/609,107, 9 pages.
Lam et al., "Dynamic Maneuvering Configuration for Multiple Control Modes in a Unified Servo System," U.S. Appl. No. 14/333,705, filed Jul. 17, 2014, 36 pages.
Lam et al., "Impedance Compensation for Operational Amplifiers Used in Variable Environments," Office Action mailed Feb. 7, 2014, for U.S. Appl. No. 13/609,107, 11 pages.
Lam et al., "Impedance Compensation for Operational Amplifiers Used in Variable Environments," Amendment filed May 6, 2014, for U.S. Appl. No. 13/609,107, 12 pages.
Manfredi et al., "Additive Manufacturing of Al Alloys and Aluminium Matrix Composites (AMCs)," in Monteiro (ed.), *Light Metal Alloys Applications*, InTech, Jun. 11, 2014, 32 pages.
Merriam-Webster, "Directly," retrieved from http://www.merriam-webster.com/dictionary/directly, on Nov. 6, 2012, 1 page.
Mitsuya, "Basics of Noise Countermeasures—Lesson 14: Using Common Mode Choke Coils for Power Supply Lines," Murata Manufacturing Co., Ltd., Oct. 28, 2014, retrieved on Feb. 4, 2015, from http://www.murata.com/en-eu/products/emiconfun/emc/2014/10/28/en-20141028-p1, 3 pages.

Ng, "Implementing Constant Current Constant Voltage AC Adapter by NCP1200 and NCP4300A," On Semiconductor, Application Note, Publication Order No. AND8042/D, Feb. 2001, 12 pages.
Nguyen et al., "Nulling Input Offset Voltage of Operational Amplifiers," Mixed Signal Products, Texas Instruments—Application Report SLOA045, Aug. 2000, pp. 1-15.
Parker, "Switched Capacitor Hold-Up Scheme for Constant Boost Output Voltage," Amendment filed Feb. 15, 2013, for U.S. Appl. No. 12/751,067, 15 pages.
Parker, "Switched Capacitor Hold-Up Scheme for Constant Boost Output Voltage," Office Action mailed Mar. 28, 2012, for U.S. Appl. No. 12/751,067, 16 pages.
Parker, "Switched Capacitor Hold-Up Scheme for Constant Boost Output Voltage," Amendment filed Jul. 30, 2012, for U.S. Appl. No. 12/751,067, 18 pages.
Parker, "Switched Capacitor Hold-Up Scheme for Constant Boost Output Voltage," Office Action mailed Nov. 16, 2012, for U.S. Appl. No. 12/751,067, 20 pages.
Parker, "Switched Capacitor Hold-Up Scheme for Constant Boost Output Voltage," Amendment filed Jan. 16, 2013, for U.S. Appl. No. 12/751,067, 15 pages.
Parker, "Switched Capacitor Hold-Up Scheme for Constant Boost Output Voltage," Office Action mailed Jul. 30, 2013, for U.S. Appl. No. 12/751,067, 18 pages.
Parker, "Switched Capacitor Hold-Up Scheme for Constant Boost Output Voltage," Amendment filed Oct. 30, 2013, for U.S. Appl. No. 12/751,067, 19 pages.
Parker, "Switched Capacitor Hold-Up Scheme for Constant Boost Output Voltage," Notice of Allowance mailed Feb. 3, 2014, for U.S. Appl. No. 12/751,067, 11 pages.
Parker, "Transformer-Based Power Converters With 3-D Printed Microchannel Heat Sink," U.S. Appl. No. 14/627,556, filed Feb. 20, 2015, 44 pages.
Pascu, "Error Amplifier with Forced Equilibrium Adaptor," Kepco, Inc., retrieved from http://www.kepcopower.com/equibm2.htm#fig2, dated May 22, 2014, 8 pages.
Shrisavar, "Introduction to Power Management," Texas Instruments, Biracha Digital Power Ltd., 2014, 37 pages.
Waltman et al., "Input Control Apparatus and Method With Inrush Current, Under and Over Voltage Handling," Office Action mailed Jun. 17, 2014, for U.S. Appl. No. 13/185,210, 8 pages.
Waltman et al., "Power Converter Apparatus and Method With Compensation for Current Limit/Current Share Operation," Office Action mailed Dec. 17, 2013, for U.S. Appl. No. 13/185,172, 15 pages.
Waltman et al., "Power Converter Apparatus and Method With Compensation for Current Limit/Current Share Operation," Amendment filed Mar. 17, 2014, for U.S. Appl. No. 13/185,172, 16 pages.
Waltman et al., "Power Converter Apparatus and Method With Compensation for Current Limit/Current Share Operation," Notice of Allowance mailed May 8, 2014, for U.S. Appl. No. 13/185,172, 10 pages.
Waltman et al., "Power Converter Apparatus and Methods," U.S. Appl. No. 61/508,937, filed Jul. 18, 2011, 139 pages.
Written Opinion, mailed Dec. 20, 2013, for PCT/US2013/058784, 4 pages.
Written Opinion, mailed Oct. 14, 2011, for PCT/US2011/030778, 5 pages.
Xing et al., "Power System Architecture with Back-Up Power for Servers," ERC Program of the National Science Foundation, 5 pages.
Chinese Office Action with English Translation dated May 22, 2015, for corresponding CN Application No. 201280016631.1, 15 pages.
Parker et al., "Transformer-Based Power Converters With 3D Printed Microchannel Heat Sink," Office Action mailed Apr. 16, 2015, for U.S. Appl. No. 14/627,556, 9 pages.
International Search Report and Written Opinion, mailed Aug. 31, 2015 for International Patent Application No. PCT/US2015/033321, 9 pages.
Parker, "Transformer-Based Power Converters With 3D Printed Microchannel Heat Sink," Office Action, dated Aug. 3, 2015, for U.S. Appl. No. 14/627,556, 11 pages.

* cited by examiner

INTEGRATED TRI-STATE ELECTROMAGNETIC INTERFERENCE FILTER AND LINE CONDITIONING MODULE

BACKGROUND

1. Technical Field

The present disclosure generally relates to filtering and conditioning components for power systems.

2. Description of the Related Art

Direct current-to-direct current (DC/DC) converters that operate from vehicle power (e.g., spacecraft, aircraft, missiles, ground vehicles, marine applications) are designed to operate over a steady state voltage range around a nominal operating point, e.g., 28 V dc, and to accommodate transients at their input. The transients can be characterized as surges and sags in input voltage and voltage spikes of one sort or another. Generally, surges and sags are voltage increases/decreases that are of relatively long duration from sources with relatively low source impedance. Spikes are of much shorter duration, have higher amplitude, may be of either polarity, and are usually limited in energy.

Switch-mode power converters (SMPCs) are a source of electromagnetic interference (EMI) in electronic equipment. In order to comply with strict electromagnetic compatibility (EMC) requirements, an EMI filter is often needed at the input of a SMPC. The design of EMI filters aims at achieving required insertion loss (IL), i.e. attenuation of the power of the unwanted electromagnetic emissions (EME) from a switch-mode DC/DC converter.

SMPCs are the most widely used DC power supplies because SMPCs are significantly smaller, lighter and more efficient than linear power supplies. The main drawback of SMPCs is the current related electromagnetic interference (EMI) at their inputs and voltage related interference at their outputs. The requirements of the load dictate the design of the output filter, which is an important part of the design of the converter and its controller. The input EMI filter, on the other hand, is normally not necessary for the operation of the converter itself. The design of the EMI filter aims at achieving required insertion loss (IL), i.e. attenuation of the power of the unwanted electromagnetic emissions (EME) from a switch-mode DC/DC converter. The task of the input filter is to ensure EMC within the system or with neighboring systems, and to comply with relevant EMC standards.

FIG. 1 shows an example of an EMI filter 10 positioned between a switching power converter 12 and an input voltage source 14. Assuming the components of the EMI filter 10 do not vary with time, the EMI filter may be considered a passive linear electrical circuit.

The EMI filter 10 includes a single common mode filter stage 16 that includes a common mode EMI choke or inductor $L_{CM}$ and two bypass capacitors $C_{Y1}$ and $C_{Y2}$. The EMI filter 10 also includes a single differential mode filter stage 18 that includes a differential mode EMI inductor $L_{DM1}$ and a bypass capacitor $C_{X1}$. The EMI filter 10 is coupled between input terminals 20, 22 of the switching power converter 12 (or other noise source) and output terminals 24, 26 of the input power source 14. The power converter 112 generates common mode noise and differential mode noise.

When a differential current such as the normal operation current of the switching power converter 12 passes through the common mode EMI inductor $L_{CM}$, the differential current cancels out in two windings of the common mode EMI inductor $L_{CM}$. As a result, there is no net magnetization of the core of the common mode EMI inductor $L_{CM}$. Consequently, the common mode EMI inductor $L_{CM}$ has no impact on the differential current. In contrast, when a common mode noise current passes through the common mode EMI inductor $L_{CM}$, the common mode noise current magnetizes the core of the common mode EMI inductor $L_{CM}$. As a result, the common mode EMI inductor $L_{CM}$ show high impedance for the common mode noise current so as to prevent the common mode noise current from polluting the input power source.

Two common mode bypass capacitors $C_{Y1}$ and $C_{Y2}$ are connected in series and coupled between the two input terminals of the power converter 112. A joint node 28 of the two common mode bypass capacitors $C_{Y1}$ and $C_{Y2}$ is coupled to ground. The common mode bypass capacitors $C_{Y1}$ and $C_{Y2}$ conduct common mode noise generated by the power converter 12 to ground.

The differential mode EMI choke or inductor $L_{DM1}$ is coupled between the common mode EMI inductor $L_{CM}$ and the positive input 20 of the power converter 12. The differential mode EMI inductor $L_{DM1}$ suppresses differential mode noise generated by the power converter 12.

The differential mode bypass capacitor $C_{X1}$ is coupled between the input terminals 20 and 22 of the power converter 12 and the differential mode EMI inductor $L_{DM1i}$ and is connected in parallel with the common mode bypass capacitors $C_{Y1}$ and $C_{Y2}$.

Generally, EMI filtering is required between a switching power converter and an input voltage source to achieve compliance to regulatory limits on conducted emissions. For example, the MIL-STD-461 defines the EMI requirements for subsystems and equipment used in military applications. European Community Directive on EMC, Euro-Norm EN 55022 or 55081 is another common industry standard on conducted radio frequency emissions.

The power converters typically used in commercial aerospace and military applications may be designed for applications where the input voltage source is 28 V DC input (nominal). The input voltage source is normally defined by a specification or standard. For military airborne applications, this standard may be MIL-STD-704. For military ground applications, the standard may be MIL-STD-1275, and for shipboard applications the standard may be MIL-STD-1399. Commercial aerospace applications may use the MIL-STD-704 standard and more often the DO-160 standard. Some commercial aerospace applications may utilize standards where the 28 V DC source was defined by the GJB181-1986 and GJB181A-20 standards.

Each of these source requirement documents defines a steady-state range of input voltage and a range of transient voltages that the load equipment (e.g., power converter) is required to accept. Each of these documents has a number of revisions that over time typically evolve toward tighter limits on the transient extremes and sometimes on the steady-state range as well as generation equipment, and the controls for them, have improved. However, when a product is being developed, it is desired that the product be capable of operating over the widest range possible so that the product can be used on the largest number of platforms, including those developed when early versions of the source specification was in place. This is also typical for custom products since many platforms remain in service for many years, and particularly when the application is targeted for sale to multiple platforms.

For example, the steady-state range for 28 V input sources across these documents is typically from a narrowest range of 22 V DC to 29 V DC and a widest range of 18 V DC to 36 V DC. The widest transient voltage range is from MIL-STD- 1275, which specifies a high transient level of 100 V and a low transient level of 6 V (when operation during cranking is required).

Many standard DC/DC converters are designed to operate from 28 V input sources accept 15-40 V steady-state and 50 V transient. Some DC/DC converters may be designed for 15-50 V steady-state and 80 V transient, for example.

In order to use such power converters with input sources that have wider steady-state and transient requirements, three additional functions may need to be added to the converters, namely, an EMI filter, a boost converter (e.g., for low transients between 8V and 15V), and a transient limiter (e.g., for high transients between 50 V and 80 V). These functions may be added to the power converters as separate functional components.

The wide input range required for power converters is generally accomplished either by designing the power converter to operate over the full input range or by adding separate boost and or transient clipping/limiting functional blocks, depending on the required input range and the designed input range of the power conversion stage. Requiring a power converter to operate over the full input range when the input power source has a very wide input range (e.g., as much as 10:1) results in compromises to the power converter design, including lower efficiency. Such designs also prevent use of existing available converters that are not designed for the required wide input range. Moreover, use of separate functional blocks for EMI compliance, power conversion, and low-side (boost) or high side (clipping/limiting) functions can achieve good electrical performance but generally requires greater volume and higher cost.

BRIEF SUMMARY

An electromagnetic interference (EMI) filter and line-conditioning (EMI-LC) circuit, the EMI-LC circuit having an input coupleable to an output of an input power source and an output coupleable to an input of a noise source, the EMI-LC circuit may be summarized as including: a passive differential mode EMI filter circuit that includes a differential mode EMI inductor and a differential mode EMI capacitor; a boost converter circuit that includes a boost control switch, a boost output switch, the differential mode EMI inductor, and the differential mode EMI capacitor; a feedback circuit operably coupled to the input of the EMI-LC circuit to sense input characteristic information at the input of the EMI-LC circuit; and a control circuit operatively coupled to the feedback circuit to receive the input characteristic information from the feedback circuit and operatively coupled to the boost control switch, the control circuit controls at least the boost control switch to one of disable the boost converter circuit or enable the boost converter circuit based at least in part on the input characteristic information received from the feedback circuit.

The boost output switch of the boost converter circuit may include a metal-oxide-semiconductor field-effect transistor (MOSFET), and the control circuit may control the boost output switch of the boost converter circuit to be in an ON state when the boost converter circuit is disabled and controls the boost output switch of the boost converter circuit to be in an OFF state when the boost converter circuit is enabled. The boost output switch of the boost converter may include a diode. The EMI-LC circuit may further include: a passive common mode EMI filter that includes a common mode EMI inductor and at least two bypass EMI capacitors. The control circuit may apply a pulse width modulated signal to a control node of the boost control switch to enable the boost converter circuit. The control circuit may control the boost control switch of the boost converter circuit to be in an OFF state to disable the boost converter circuit. The control circuit may control the boost control switch of the boost converter circuit to enable the boost converter circuit when a voltage at the input of the EMI-LC circuit is below a determined voltage level, and the control circuit may control the boost control switch of the boost converter circuit to disable the boost converter circuit when the voltage at the input of the EMI-LC circuit is at or above the determined voltage level. The EMI-LC circuit may further include: a linear regulator circuit coupled between the input of the EMI-LC circuit and the output of the EMI-LC circuit, the linear regulator circuit includes a controllable linear pass element, wherein the control circuit is operatively coupled to the linear pass element, and the control circuit controls the linear pass element to increase a resistance of the linear pass element when a voltage at the input of the EMI-LC circuit is above a determined voltage level. The linear pass element may include at least one of a MOSFET or a bipolar junction transistor (BJT). The EMI-LC circuit may further include: a buck converter circuit that includes a buck control switch, a buck shunt switch, the differential mode EMI inductor, and the differential mode EMI capacitor, wherein control circuit is operatively coupled to the buck control switch, and the control circuit controls the buck control switch to one of disable the buck converter circuit or enable the buck converter circuit based at least in part on the input characteristic information received from the feedback circuit. The buck shunt switch of the boost converter may include a diode. The EMI-LC circuit may further include: a passive common mode EMI filter that includes a common mode EMI inductor and at least two bypass capacitors. The control circuit may apply a pulse width modulated signal to a control node of the buck control switch to enable the buck converter circuit. The control circuit may control the buck control switch of the buck converter circuit to be in an ON state to disable the buck converter circuit. The control circuit may control the buck control switch of the buck converter circuit to enable the buck converter circuit when a voltage at the input of the EMI-LC circuit is above a determined voltage level, and the control circuit may control the buck control switch of the buck converter circuit to disable the buck converter circuit when the voltage at the input of the EMI-LC circuit is at or below the determined voltage level. The control circuit may include a pulse width modulation (PWM) control circuit and the noise source may include a DC/DC switching power converter. The EMI-LC circuit may further include: a transient limiter circuit that includes one of a linear regulator circuit or a switching regulator circuit, wherein in operation the switching regulator circuit utilizes the differential mode EMI inductor and the differential mode EMI capacitor.

An electromagnetic interference (EMI) filter and line-conditioning (EMI-LC) circuit, the EMI-LC circuit having an input coupleable to an output of an input power source and an output coupleable to an input of a noise source, the EMI-LC circuit may be summarized as including: a passive differential mode EMI filter circuit that includes a differential mode EMI inductor and a differential mode EMI capacitor; a passive common mode EMI filter that includes a common mode EMI inductor and at least two bypass EMI capacitors; a boost converter circuit that includes a boost control switch, a boost output switch, the differential mode EMI inductor, and the differential mode EMI capacitor; a transient limiter circuit that includes one of a linear regulator circuit or a switching regulator circuit, wherein in operation the switching regulator circuit utilizes the differential mode EMI inductor and the differential mode EMI capacitor; a feedback circuit operably coupled to the input of the EMI-LC circuit to sense an input voltage level applied at the input of the EMI-LC circuit by the input power source; and a control circuit operatively coupled to the feedback circuit to receive an input voltage level indication from the feedback circuit and operatively coupled to the boost control switch, the control circuit controls the boost control switch to one of disable the boost converter circuit or enable the boost converter circuit based at least in part on the input voltage level indication received from the feedback circuit.

The boost output switch of the boost converter circuit may include a metal-oxide-semiconductor field-effect transistor (MOSFET), and the control circuit may control the boost output switch of the boost converter circuit to be in an ON state when the boost converter circuit is disabled and may control the boost output switch of the boost converter circuit to be in an OFF state when the boost converter circuit is enabled. The boost output switch of the boost converter may include a diode.

A method of operation to control an electromagnetic interference (EMI) filter and line-conditioning (EMI-LC) circuit, the EMI-LC circuit having an input coupleable to an output of an input power source and an output coupleable to an input of a noise source, the EMI-LC circuit may be summarized as including: a passive differential mode EMI filter circuit that includes a differential mode EMI inductor and a differential mode EMI capacitor; a boost converter circuit that includes a boost control switch, a boost output switch, the differential mode EMI inductor, and the differential mode EMI capacitor; a feedback circuit operably coupled to the input of the EMI-LC circuit to sense input characteristic information at the input of the EMI-LC circuit; and a control circuit operatively coupled to the feedback circuit and the boost control switch, the method comprising: receiving, at the control circuit from the feedback circuit, the input characteristic information; and controlling, via the control circuit, the boost control switch to one of disable the boost converter circuit or enable the boost converter circuit based at least in part on the input characteristic information received from the feedback circuit.

The boost output switch of the boost converter circuit may include a metal-oxide-semiconductor field-effect transistor (MOSFET), the method may further include: controlling, via the control circuit, the boost output switch of the boost converter circuit to be in an ON state when the boost converter circuit is disabled; and controlling, via the control circuit, the boost output switch of the boost converter circuit to be in an OFF state when the boost converter circuit is enabled. Controlling the boost control switch may include applying a pulse width modulated signal to a control node of the boost control switch to enable the boost converter circuit. Controlling the boost control switch may include controlling the boost control switch of the boost converter circuit to be in an OFF state to disable the boost converter circuit. Controlling the boost control switch of the boost converter circuit to enable the boost converter circuit may include controlling the boost control switch to enable the boost converter circuit when a voltage at the input of the EMI-LC circuit is below a determined voltage level, and controlling the boost control switch of the boost converter circuit to disable the boost converter circuit comprises controlling the boost control switch to disable the boost converter circuit when the voltage at the input of the EMI-LC circuit is at or above the determined voltage level. The EMI-LC may include a linear regulator circuit coupled between the input of the EMI-LC circuit and the output of the EMI-LC circuit, the linear regulator circuit may include a controllable linear pass element; and the control circuit may be operatively coupled to the linear pass element, the method may further include: controlling, via the control circuit, the linear pass element to increase a resistance of the linear pass element when a voltage at the input of the EMI-LC circuit is above a determined voltage level. The EMI-LC circuit may include a buck converter circuit that includes a buck control switch, a buck shunt switch, the differential mode EMI inductor, and the differential mode EMI capacitor; and the control circuit may be operatively coupled to the buck control switch, the method may further include: controlling, via the control circuit, the buck control switch to one of disable the buck converter circuit or enable the buck converter circuit based at least in part on the input characteristic information received from the feedback circuit. Controlling the buck control switch may include applying a pulse width modulated signal to a control node of the buck control switch to enable the buck converter circuit. Controlling the buck control switch may include controlling the buck control switch of the buck converter circuit to be in an ON state to disable the buck converter circuit. Controlling the buck control switch to enable the buck converter circuit may include controlling the buck control switch of the buck converter circuit to enable the buck converter circuit when a voltage at the input of the EMI-LC circuit is above a determined voltage level; and controlling the buck control switch to disable the buck converter circuit may include controlling the buck control switch of the buck converter circuit to disable the buck converter circuit when the voltage at the input of the EMI-LC circuit is at or below the determined voltage level.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the various embodiments have not been shown or described in detail to avoid unnecessarily obscuring descriptions of the embodiments.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the context clearly dictates otherwise. It should also be noted that the term "or" is generally employed in its broadest sense, that is, as meaning "and/or" unless the context clearly dictates otherwise.

The headings and Abstract of the Disclosure provided herein are for convenience only and do not interpret the scope or meaning of the embodiments.

Implementations of the present disclosure are directed to systems and methods for integrating the functions and features of a passive EMI filter with an active clipper for high-side line transients and/or an active boost converter for low-side line transients. During steady-state operation, the active circuitry is disabled so the circuit functions as a passive EMI filter. Inductive and capacitive components used in the passive EMI filter during steady-state operation may serve a dual role and become part of a boost converter when the input voltage is below a low-line steady-state and, in some variations, the inductive and capacitive components of the passive EMI filter may become part of a transient clipper when the input voltage is above a high-line steady-state level.

Figure 1:
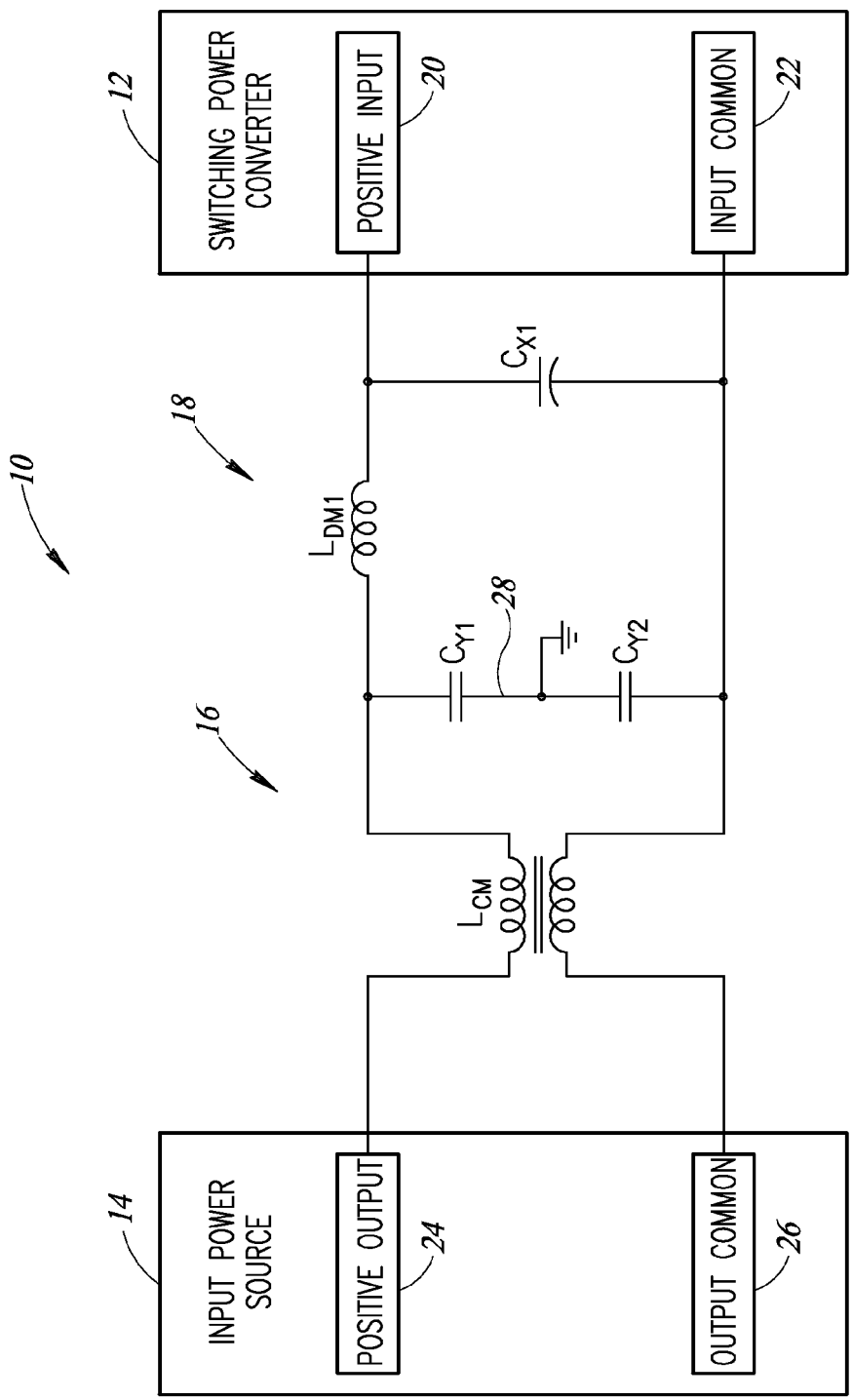
FIG. 1 is a functional schematic diagram of a conventional EMI filter coupled between an input power source and a switching power converter.
Figure 2:
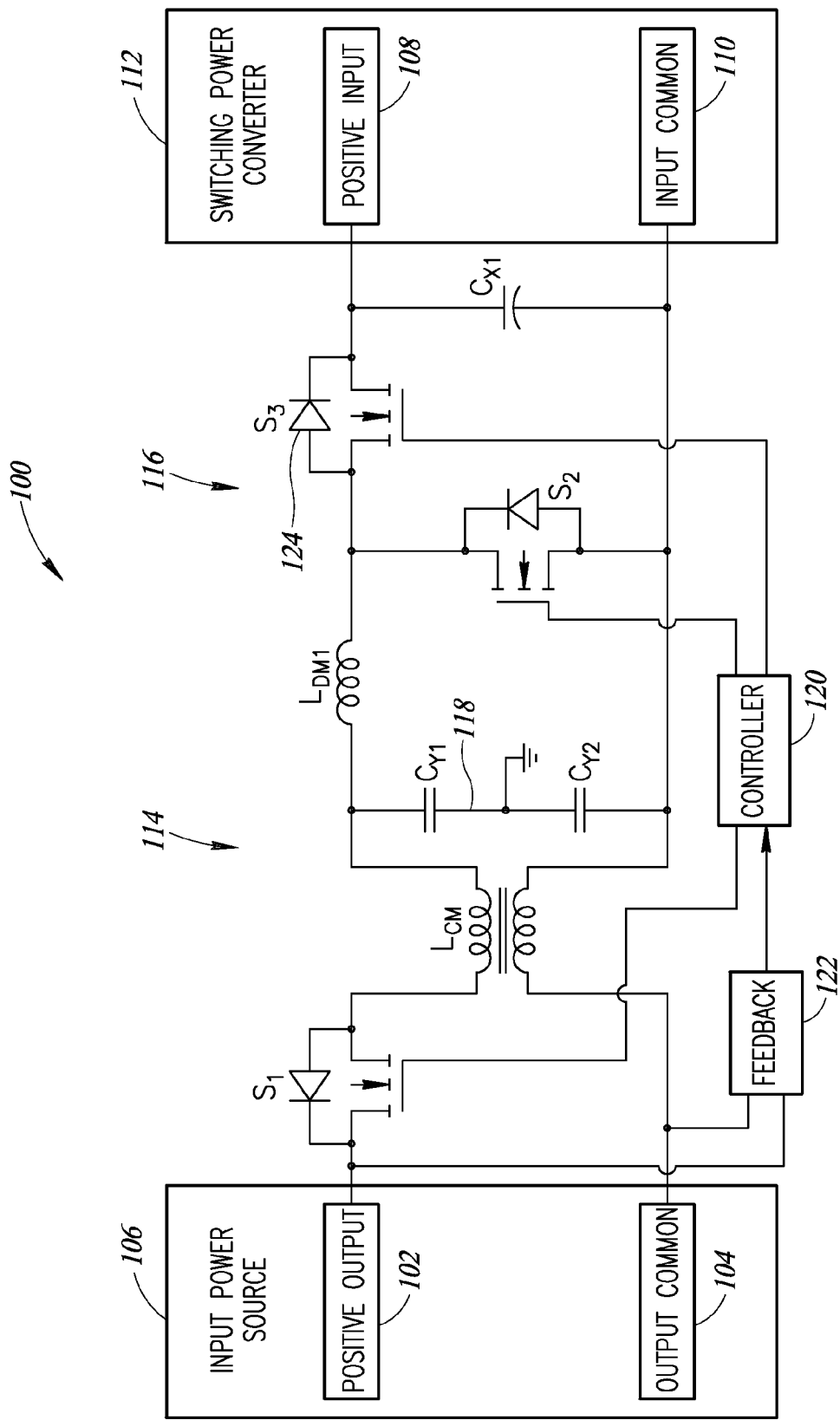
FIG. 2 is a functional schematic diagram of an integrated EMI filter and line conditioning module coupled between an input power source and a switching power converter, the integrated EMI filter and line conditioning module includes an EMI filter, a boost converter and a linear regulator, according to at least one illustrated embodiment.
Figure 3:
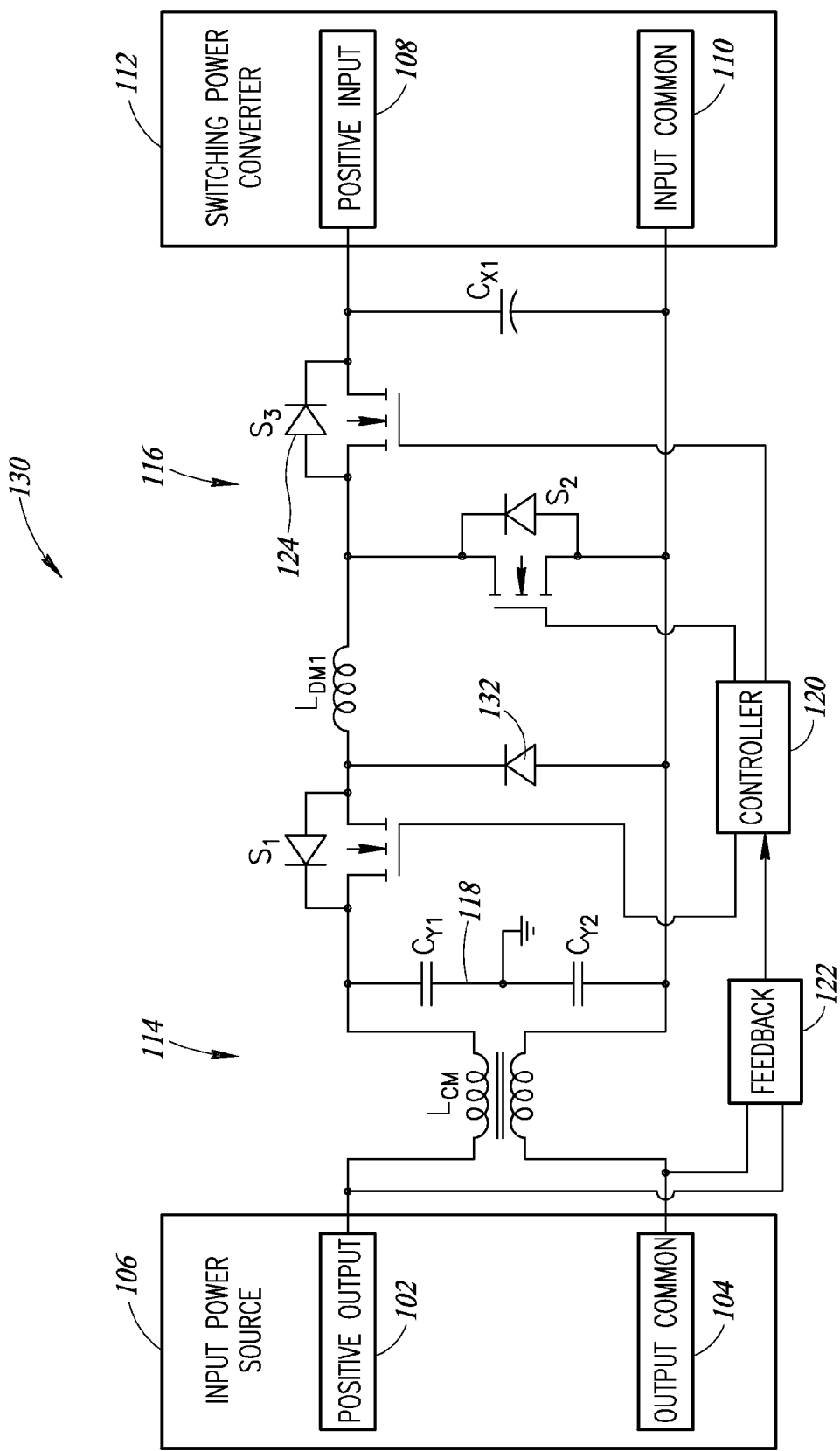
FIG. 3 is a functional schematic diagram of an integrated EMI filter and line conditioning module coupled between an input power source and a switching power converter, the integrated EMI filter and line conditioning module includes an EMI filter, a boost converter and a buck converter, according to at least one illustrated embodiment.

As discussed further below, a transient clipper may be implemented as a linear pass element (FIG. 2) that is saturated ON in normal operation or as a switch-mode converter, e.g., buck regulator (FIG. 3).

By utilizing an EMI filter for other purposes when outside of the steady-state range, other power train functions that are required only when operating outside of steady-state range may be integrated into the EMI filter, which provides volume and/or cost reduction.

FIG. 2 shows a schematic functional diagram of an integrated EMI filter and line conditioning (EMI-LC) module or circuit 100. The EMI-LC module 100 may be positioned between output terminals 102 and 104 of an input power source 106 and input terminals 108 and 110 of a switching power converter 112 (or other downstream noise source), for example.

The EMI-LC module 100 includes a single common mode filter stage 114 that includes a common mode choke or inductor $L_{CM}$ and two bypass capacitors $C_{Y1}$ and $C_{Y2}$. The EMI-LC module 100 also includes a single differential mode filter stage 116 that includes a differential mode EMI inductor $L_{DM1}$ and a bypass capacitor $C_{X1}$. The EMI-LC module 100 is coupled between input terminals 108 and 110 of the switching power converter 112 (or other noise source) and the output terminals 102 and 104 of the input power supply 106. The power converter 112 generates common mode noise and differential mode noise. The EMI-LC module 100 may be applied to a variety of isolated power converters including, but not limited to, LLC resonant converters, half bridge converters, full bridge converters, flyback converters, forward converters, push-pull converters and the like. Furthermore, the EMI-LC module may also be applied to a variety of non-isolated power converters including, but not limited to, buck switching converters, boost switching converters, buck-boost switching converters, and the like.

When a differential current such as the normal operation current of the switching power converter 112 passes through the common mode EMI inductor $L_{CM}$, the differential current cancels out in two windings of the common mode EMI inductor $L_{CM}$. As a result, there is no net magnetization of the core of the common mode EMI inductor $L_{CM}$. Consequently, the common mode EMI inductor $L_{CM}$ has no impact on the differential current. In contrast, when a common mode noise current passes through the common mode EMI inductor $L_{CM}$, the common mode noise current magnetizes the core of the common mode EMI inductor $L_{CM}$. As a result, the common mode EMI inductor $L_{CM}$ show high impedance for the common mode noise current so as to prevent the common mode noise current from polluting the input power source.

The two common mode bypass capacitors $C_{Y1}$ and $C_{Y2}$ are connected in series and coupled between the two input terminals 108 and 110 of the power converter 112. A joint node 118 of the two common mode bypass capacitors $C_{Y1}$ and $C_{Y2}$ is coupled to ground. The common mode bypass capacitors $C_{X1}$ and $C_{X2}$ suppress common mode noise generated by the power converter 112.

The differential mode choke or inductor $L_{DM1}$ is coupled between the common mode EMI inductor $L_{CM}$ and the positive input terminal 108 of the power converter 112. The differential mode EMI inductor $L_{DM1}$ suppresses differential mode noise generated by the power converter 112.

The differential mode bypass capacitor $C_{X1}$ is coupled between the input terminals 108 and 110 of the power converter 112 and the differential mode EMI inductor $L_{DM1}$ and is connected in parallel with the common mode bypass capacitors $C_{Y1}$ and $C_{Y2}$.

As shown in FIG. 2, a first switch $S_1$ is coupled between the positive output terminal 102 of the input power source 106 and the common mode EMI inductor $L_{CM}$. A second switch $S_2$, which may be referred to as a shunt switch or boost converter switch, is coupled across the line terminals between the differential mode EMI inductor $L_{DM1}$ and a third switch $S_3$, which is coupled between the differential mode EMI inductor $L_{DM1}$ and the positive input terminal 108 of the switching power converter 112. The switches $S_1$, $S_2$ and $S_3$ are each coupled to a controller 120 (e.g., a pulse width modulation (PWM) controller) that operates to selectively control the opening and closing of the switches. The switches $S_1$, $S_2$ and $S_3$ may be any type of suitable switches, such as passive semiconductor switches (e.g., diodes) or active semiconductor switches (e.g., metal-oxide-semiconductor field-effect transistors (MOSFETs), bipolar junction transistors (BJT), insulated gate bipolar transistors (IGBTs)), or one or more combinations thereof.

In some implementations, a feedback circuit 122 may be coupled across the input terminals of the EMI-LC module 100 which are coupled to the output terminals 102 and 104 of the input power source 106. The feedback circuit 122 detects input characteristic information (e.g., voltage) at the input of the EMI-LC module (i.e., output terminals 102 and 104 of the input power source 106) and provides an indicator of such detected input characteristic information to the controller 120. For example, the feedback circuit 122 may include one or more resistors that implement one or more voltage divider circuits and/or one or more current sensing circuits. The controller 120 may utilize the detected input characteristic information to adjust the control of the switches $S_1$, $S_2$ and $S_3$.

By adding the three switches $S_1$, $S_2$, and $S_3$ and the controller 120, the EMI-LC module 100 can perform the functions of boosting low input voltages and limiting high transient voltages. These functions may be disabled in normal operation, when the input voltage from the input power source 106 is in the steady-state range, by having the first switch $S_1$ and the third switch $S_3$ turned ON (i.e., closed) and the second switch $S_2$ turned OFF (i.e., opened). Thus, with the switches $S_1$, $S_2$, and $S_3$ in these states, the EMI-LC module 100 functions as a conventional EMI filter (EMI filter mode), as discussed above.

When the input voltage rises above a set-point (e.g., 45 V) that is set above the steady-state voltage (e.g., 28 V), the first switch $S_1$ may be used to implement a linear regulator in a transient limiting/clipping mode of operation. That is, the controller 120 operates the first switch $S_1$ in the first switch's linear mode so the first switch operates as a variable resistor in series with the output of the EMI-LC module 100. The feedback circuit 122 senses the input voltage and provides an indicator of the sensed input voltage to the controller 120, which controls the first switch $S_1$ in its linear mode to regulate the control voltage applied to the first switch $S_1$. The set-point for operating the first switch $S_1$ as a linear regulator should be set above the steady-state range of the input voltage but below the transient limit of the downstream power converter 112. In practice, the set-point may be set as high as possible to limit dissipation in transient mode but with allowance for circuit tolerances so the highest output is always below the transient limit of the power converter 112 or other following module (s). The first switch $S_1$ is shown as an N-channel enhancement type MOSFET, but this functionality may be implemented with a different type of semiconductor switch (e.g., bipolar junction transistor (BJT)) or other suitable component(s).

As shown in FIG. 2, the second switch $S_2$ is placed as a shunt following the differential mode EMI inductor $L_{DM1}$. The second switch $S_2$ is controlled by the controller 120 to be OFF during normal operation. When input voltage is determined to be below the steady-state voltage level, the second switch $S_2$ may be used as the switching element of a boost converter in a boost mode of operation. The boost converter utilizes the differential mode EMI inductor $L_{DM1}$ as the boost inductor and the differential mode EMI capacitor $C_{X1}$ as the boost capacitor.

When operating in the boost mode, the first switch $S_1$ is controlled to be in the ON state. The third switch $S_3$ is controlled to be in the OFF state (i.e., opened) and a body diode 124 inherent in the third switch $S_3$ serves as the boost output diode. As noted above, the third switch $S_3$ may be switched ON when the EMI-LC module 100 is not in the boost mode to reduce power dissipation. In some implementations, the third switch $S_3$ may be switched during the boost mode of operation to operate as a synchronous rectifier, which may reduce power consumption.

In the boost mode of operation, the controller 120 supplies a high frequency square wave (e.g., a PWM signal) to the gate of the second switch $S_2$. During ON periods when the second switch $S_2$ is conducting, the input current flows through the differential mode EMI inductor $L_{DM1}$ and, via the second switch $S_2$, directly back to the output common terminal 104 of the input power supply 106, thereby charging up the magnetic field around the differential mode EMI inductor $L_{DM1}$. While the second switch $S_2$ is turned ON, the body diode 124 of the third switch $S_3$ cannot conduct as its anode is being held at ground potential by the heavily conducting second switch $S_2$. For the duration of the ON period, the switching power converter 112 is being supplied entirely by the charge on the differential mode capacitor $C_{X1}$, built up on previous oscillator cycles.

At the start of the OFF period of the second switch $S_2$, the differential mode EMI inductor $L_{DM1}$ is charged and the differential mode capacitor $C_{X1}$ is partially discharged. The differential mode EMI inductor $L_{DM1}$ now generates a back electromotive force (emf) which has a value that depends on the rate of change of current as the second switch $S_2$ switches and depends on the amount of inductance the EMI inductor $L_{DM1}$ possesses. The polarity of the voltage across the differential mode EMI inductor $L_{DM1}$ is now reversed, and so adds to the input voltage giving an output voltage that is at least equal to or greater than the input supply voltage. The body diode 124 of the third switch $S_3$ is now forward biased and so the circuit current supplies the power converter 112, and at the same time recharges the differential mode EMI capacitor $C_{X1}$ ready for the next ON period of the second switch.

FIG. 3 shows another implementation of an EMI-LC module 130. The EMI-LC module 130 is similar in many respects to the EMI-LC module 100 of FIG. 2, so only differences between the two modules are discussed here for the sake of brevity. In this implementation, the first switch $S_1$ is operated in switch-mode as a buck converter rather than operated as a linear regulator. In this implementation, the first switch $S_1$ is positioned after the common mode filter stage 114. The buck converter uses the differential mode EMI inductor $L_{DM1}$ as the buck inductor, the differential mode capacitor $C_{X1}$ as the buck output capacitor, and a buck shunt diode 132 placed across the line between the first switch $S_1$ and the differential mode EMI inductor $L_{DM1}$. The buck diode 132 may be a Schottky type diode, for example.

The operation of the EMI-LC module 130 in the buck mode when the input voltage is above a steady-state voltage is now described. In the buck mode, the second switch $S_2$ is continuously turned OFF and the third switch $S_1$ may be continuously turned ON. The first switch $S_1$ is switched ON and OFF by a high frequency square wave (e.g., PWM signal) from the controller 120. When the first switch $S_1$ is turned ON, current flows through the differential mode EMI inductor $L_{DM1}$, charging the magnetic field thereof, charging the differential mode EMI capacitor $C_{X1}$, and supplying the power converter 112. The buck diode 132 is turned OFF due to the positive voltage on its cathode.

When the controller 120 switches the first switch $S_1$ OFF, the initial source of current is now the differential mode EMI inductor $L_{DM1}$. The differential mode EMI inductor's $L_{DM1}$ magnetic field collapses, which generates a back emf that reverses the polarity of the voltage across the differential mode EMI inductor. This action turns on the buck diode 132 so that current flows through the third switch $S_3$ to the power converter 112.

As the current due to the discharge of the differential mode EMI inductor $L_{DM1}$ decreases, the charge accumulated in the differential mode EMI capacitor $C_{X1}$ during the ON period of the first switch $S_1$ now also adds to the current flowing through the power converter 112, keeping the output voltage reasonably constant during the OFF period. This helps keep the ripple amplitude to a minimum and the output voltage near the set value.

There are a number of variations of the EMI-LC module 130 that may be implemented. For example, some designs may utilize bipolar transistors instead of MOSFETs. In high voltage designs, silicon diodes may be used in preference to Schottky type diodes due to the silicon diode's higher reverse voltage capabilities. In other variations, synchronous switching may be used where, instead of using diodes that simply respond to the voltage polarity across the diodes, synchronized MOSFETS controlled by the controller 120 perform the switching.

The controller 120 may also carry out other functions, such as over current and over voltage protection, as well as the normal oscillator and pulse width modulation functions to regulate the output voltage.

Figure 4:
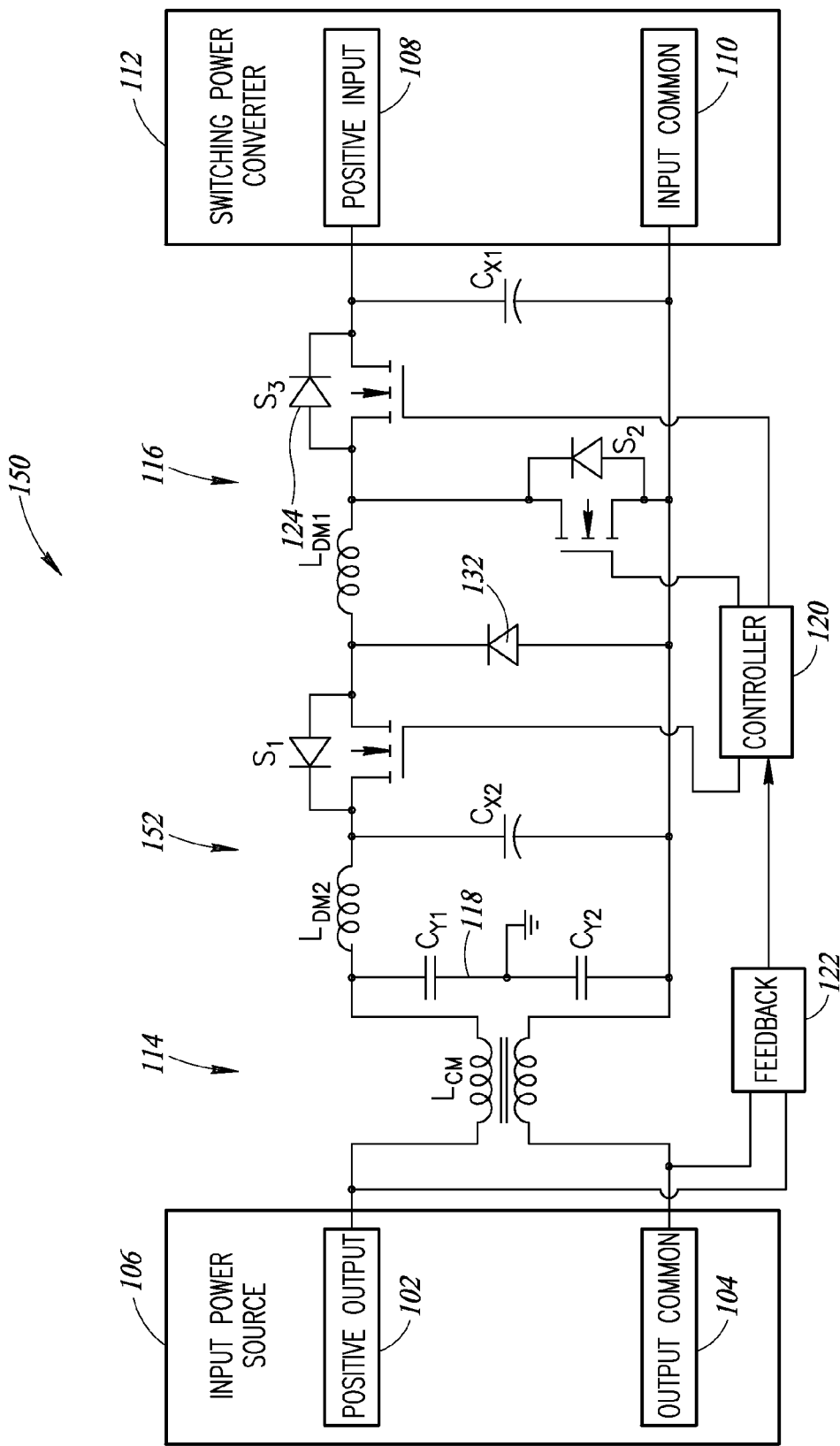
FIG. 4 is a functional schematic diagram of an integrated EMI filter and line conditioning module coupled between an input power source and a switching power converter, the integrated EMI filter and line conditioning module includes an EMI filter having dual differential mode filter stages, a boost converter and a buck converter, according to at least one illustrated embodiment.

FIG. 4 shows another implementation of an EMI-LC module 150. The EMI-LC module 150 is similar in many respects to the EMI-LC modules 100 and 130 of FIGS. 2 and 3, respectively, so only differences are discussed here for the sake of brevity.

In this implementation, the EMI-LC module 150 includes a second differential mode EMI filter stage 152 coupled in series between the common mode EMI filter stage 114 and the (first) differential mode EMI filter stage 116. Similar to the first differential mode EMI filter stage 116, the second differential mode EMI filter stage 152 includes a second differential mode EMI inductor $L_{DM2}$ and a second differential mode EMI capacitor $C_{X2}$.

Normally, the second differential mode EMI filter stage 152 (closest to the input power source 106) has a higher corner frequency and the first differential mode EMI filter stage 116 has a lower corner frequency, and thus larger inductor and capacitor values. In this configuration, the larger inductor $L_{DM1}$ and capacitor $C_{X1}$ of the first stage 116 may be the preferred components for use as the switched-mode converter elements (boost and/or buck) in the boost mode and/or buck mode. An additional benefit is that the higher frequency second stage inductor $L_{DM2}$ and capacitor $C_{X2}$ still provide some filtering of the boost converter and/or the buck converter even during transient modes (i.e., non-steady-state modes).

The EMI-LC modules may also be configured with more than one differential or common mode EMI filter stage. Generally, at least one differential mode filter stage should be present and the semiconductor devices should be configured to utilize the differential mode EMI inductor and capacitor in that stage for the boost inductor and capacitor, respectively. And, if high-side transient limiting is performed with a buck converter, the differential mode EMI inductor and the differential mode EMI capacitor are utilized for the buck inductor and buck output capacitor, respectively.

Where practical, the high-side limiting may benefit from use of a linear regulator (FIG. 2) rather than a buck converter (FIG. 3), because of the simplicity of control for a linear regulator and because the EMI filter still provides a filtering function for high transients when a linear regulator is used. While EMC compliance does not make sense in transient mode, and could not be measured, it is expected that there could be concerns about system noise particularly in buck mode as this mode results in square wave current at the input source, at least in a single stage filter. In contrast, boost mode for low transient voltages results in a triangular input current that may be continuous depending on the inductor value and load current and generally will be less of a concern.

Advantageously, by implementing the features discussed above, DC/DC converters may be better optimized for efficiency and density, compared to the option of designing DC/DC converts for accepting the full input range. Further, the implementations discussed herein allow for use of existing off-the-shelf DC/DC converter modules with wider input requirements with minimal additional size and cost. Compared to the option of having separate modules for an EMI filter, boost converter, high-side transient limiter, and DC/DC converter, the implementations discussed herein reduce the number of physical modules and their combined size and/or cost.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof.

Those of skill in the art will recognize that many of the methods or algorithms set out herein may employ additional acts, may omit some acts, and/or may execute acts in a different order than specified.

The various implementations described above can be combined to provide further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. An electromagnetic interference (EMI) filter and line-conditioning (EMI-LC) circuit, the EMI-LC circuit having an input coupleable to an output of an input power source and an output coupleable to an input of a noise source, the EMI-LC circuit comprising:
    a passive differential mode EMI filter circuit that includes a differential mode EMI inductor and a differential mode EMI capacitor;
    a boost converter circuit that includes a boost control switch controllable to be in an OFF state and an ON state, a boost output switch, the differential mode EMI inductor, and the differential mode EMI capacitor;
    a feedback circuit operably coupled to the input of the EMI-LC circuit to sense input characteristic information at the input of the EMI-LC circuit; and
    a control circuit operatively coupled to the feedback circuit to receive the input characteristic information from the feedback circuit and operatively coupled to the boost control switch, the control circuit:
        during a first time in response to a first condition of the input characteristic information, controls the boost control switch to be continuously in the OFF state to disable the boost converter circuit; and
        during a second time in response to a second condition of the input characteristic information, selectively controls the boost control switch to repeatedly switch between the OFF state and the ON state to enable the boost converter circuit which, when enabled, controllably increases an input voltage applied to the boost converter circuit.

2. The EMI-LC circuit of claim 1 wherein the boost output switch of the boost converter circuit comprises a metal-oxide-semiconductor field-effect transistor (MOSFET), and the control circuit controls the boost output switch of the boost converter circuit to be in an ON state when the boost converter circuit is disabled and controls the boost output switch of the boost converter circuit to be in an OFF state when the boost converter circuit is enabled.

3. The EMI-LC circuit of claim 1 wherein the boost output switch of the boost converter comprises a diode.

4. The EMI-LC circuit of claim 1, further comprising:
a passive common mode EMI filter that includes a common mode EMI inductor and at least two bypass EMI capacitors.

5. The EMI-LC circuit of claim 1 wherein the control circuit applies a pulse width modulated signal to a control node of the boost control switch to enable the boost converter circuit.

6. The EMI-LC circuit of claim 1, further comprising:
a transient limiter circuit that includes one of a linear regulator circuit or a switching regulator circuit, wherein in operation the switching regulator circuit utilizes the differential mode EMI inductor and the differential mode EMI capacitor.

7. The EMI-LC circuit of claim 1 wherein the control circuit controls the boost control switch of the boost converter circuit to enable the boost converter circuit when a voltage at the input of the EMI-LC circuit is below a determined voltage level, and the control circuit controls the boost control switch of the boost converter circuit to disable the boost converter circuit when the voltage at the input of the EMI-LC circuit is at or above the determined voltage level.

8. The EMI-LC circuit of claim 1, further comprising:
a linear regulator circuit coupled between the input of the EMI-LC circuit and the output of the EMI-LC circuit, the linear regulator circuit includes a controllable linear pass element,
wherein the control circuit is operatively coupled to the linear pass element, and the control circuit controls the linear pass element to increase a resistance of the linear pass element when a voltage at the input of the EMI-LC circuit is above a determined voltage level.

9. The EMI-LC circuit of claim 8 wherein the linear pass element comprises a MOSFET.

10. The EMI-LC circuit of claim 1, further comprising:
a buck converter circuit that includes a buck control switch, a buck shunt switch, the differential mode EMI inductor, and the differential mode EMI capacitor,
wherein the control circuit is operatively coupled to the buck control switch, and the control circuit:
in response to a third condition of the input characteristic information, selectively controls the buck control switch to be continuously in an ON state to disable the buck converter circuit; and
in response to a fourth condition of the input characteristic information, selectively controls the buck control circuit to repeatedly switch between the OFF state and the ON state to enable the buck converter circuit which, when enabled, controllably decreases an input voltage applied to the buck converter circuit.

11. The EMI-LC circuit of claim 10 wherein the buck shunt switch of the buck converter comprises a diode.

12. The EMI-LC circuit of claim 10, further comprising:
a passive common mode EMI filter that includes a common mode EMI inductor and at least two bypass capacitors.

13. The EMI-LC circuit of claim 10 wherein the control circuit applies a pulse width modulated signal to a control node of the buck control switch to enable the buck converter circuit.

14. The EMI-LC circuit of claim 10 wherein the control circuit controls the buck control switch of the buck converter circuit to enable the buck converter circuit when a voltage at the input of the EMI-LC circuit is above a determined voltage level, and the control circuit controls the buck control switch of the buck converter circuit to disable the buck converter circuit when the voltage at the input of the EMI-LC circuit is at or below the determined voltage level.

15. The EMI-LC circuit of claim 1 wherein the control circuit comprises a pulse width modulation (PWM) control circuit and the noise source comprises a DC/DC switching power converter.

16. An electromagnetic interference (EMI) filter and line-conditioning (EMI-LC) circuit, the EMI-LC circuit having an input coupleable to an output of an input power source and an output coupleable to an input of a noise source, the EMI-LC circuit comprising:
a passive differential mode EMI filter circuit that includes a differential mode EMI inductor and a differential mode EMI capacitor;
a passive common mode EMI filter that includes a common mode EMI inductor and at least two bypass EMI capacitors;
a boost converter circuit that includes a boost control switch controllable to be in an OFF state and an ON state, a boost output switch, the differential mode EMI inductor, and the differential mode EMI capacitor;
a transient limiter circuit that includes one of a linear regulator circuit or a switching regulator circuit, wherein in operation the switching regulator circuit utilizes the differential mode EMI inductor and the differential mode EMI capacitor;
a feedback circuit operably coupled to the input of the EMI-LC circuit to sense an input voltage level applied at the input of the EMI-LC circuit by the input power source; and
a control circuit operatively coupled to the feedback circuit to receive an input voltage level indication from the feedback circuit and operatively coupled to the boost control switch, the control circuit:
during a first time in response to a first condition of the input characteristic information, controls the boost control switch to be continuously in the OFF state to disable the boost converter circuit; and
during a second time in response to a second condition of the input characteristic information, selectively controls the boost control switch to repeatedly switch between the OFF state and the ON state to enable the boost converter circuit which, when enabled, increases an input voltage applied to the boost converter circuit.

17. The EMI-LC circuit of claim 16 wherein the boost output switch of the boost converter circuit comprises a metal-oxide-semiconductor field-effect transistor (MOSFET), and the control circuit controls the boost output switch of the boost converter circuit to be in an ON state when the boost converter circuit is disabled and controls the boost output switch of the boost converter circuit to be in an OFF state when the boost converter circuit is enabled.

18. The EMI-LC circuit of claim 16 wherein the boost output switch of the boost converter comprises a diode.

19. A method of operation to control an electromagnetic interference (EMI) filter and line-conditioning (EMI-LC) circuit, the EMI-LC circuit having an input coupleable to an output of an input power source and an output coupleable to an input of a noise source, the EMI-LC circuit comprising: a passive differential mode EMI filter circuit that includes a differential mode EMI inductor and a differential mode EMI capacitor; a boost converter circuit that includes a boost control switch controllable to be in an ON state and an OFF state, a boost output switch, the differential mode EMI inductor, and the differential mode EMI capacitor; a feedback circuit operably coupled to the input of the EMI-LC circuit to sense input characteristic information at the input of the EMI-LC circuit; and a control circuit operatively coupled to the feedback circuit and the boost control switch, the method comprising:

receiving, at the control circuit from the feedback circuit, the input characteristic information;

during a first time in response to a first condition of the input characteristic information, controlling, via the control circuit, the boost control switch to be continuously in the OFF state to disable the boost converter circuit, and during a second time in response to a second condition of the input characteristic information, controlling, via the control circuit, the boost control switch to repeatedly switch between the OFF state and the ON state to enable the boost converter circuit which, when enabled, controllably increases an input voltage applied to the boost converter circuit.

20. The method of claim 19 wherein the EMI-LC circuit comprises a buck converter circuit that includes a buck control switch, a buck shunt switch, the differential mode EMI inductor, and the differential mode EMI capacitor; and the control circuit is operatively coupled to the buck control switch, the method further comprising:

in response to a third condition of the input characteristic information, controlling, via the control circuit, the buck control switch to be continuously in an ON state to disable the buck converter circuit; and in response to a fourth condition of the input characteristic information, controlling, via the control circuit, the buck control switch to repeatedly switch between the OFF state and the ON state to enable the buck converter which, when enabled, controllably decreases an input voltage applied to the buck converter circuit.

21. The method of claim 20 wherein controlling the buck control switch comprises applying a pulse width modulated signal to a control node of the buck control switch to enable the buck converter circuit.

22. The method of claim 20 wherein controlling the buck control switch to enable the buck converter circuit comprises controlling the buck control switch of the buck converter circuit to enable the buck converter circuit when a voltage at the input of the EMI-LC circuit is above a determined voltage level; and controlling the buck control switch to disable the buck converter circuit comprises controlling the buck control switch of the buck converter circuit to disable the buck converter circuit when the voltage at the input of the EMI-LC circuit is at or below the determined voltage level.

23. The method of claim 19 wherein controlling the boost control switch comprises applying a pulse width modulated signal to a control node of the boost control switch to enable the boost converter circuit.

24. The method of claim 19 wherein the boost output switch of the boost converter circuit comprises a metal-oxide-semiconductor field-effect transistor (MOSFET), the method further comprising:

controlling, via the control circuit, the boost output switch of the boost converter circuit to be in an ON state when the boost converter circuit is disabled; and controlling, via the control circuit, the boost output switch of the boost converter circuit to be in an OFF state when the boost converter circuit is enabled.

25. The method of claim 19 wherein controlling the boost control switch of the boost converter circuit to enable the boost converter circuit comprises controlling the boost control switch to enable the boost converter circuit when a voltage at the input of the EMI-LC circuit is below a determined voltage level, and controlling the boost control switch of the boost converter circuit to disable the boost converter circuit comprises controlling the boost control switch to disable the boost converter circuit when the voltage at the input of the EMI-LC circuit is at or above the determined voltage level.

26. The method of claim 19 wherein the EMI-LC includes a linear regulator circuit coupled between the input of the EMI-LC circuit and the output of the EMI-LC circuit, the linear regulator circuit includes a controllable linear pass element; and the control circuit is operatively coupled to the linear pass element, the method further comprising:

controlling, via the control circuit, the linear pass element to increase a resistance of the linear pass element when a voltage at the input of the EMI-LC circuit is above a determined voltage level.

\* \* \* \* \*